W. J. ENGLISH.
Combined Water-Coolers and Filters.

No. 142,620.            Patented September 9, 1873.

Witnesses:

Inventor:
W. J. English
Per
Attorneys.

UNITED STATES PATENT OFFICE.

WILLIAM J. ENGLISH, OF PROVIDENCE, RHODE ISLAND.

IMPROVEMENT IN COMBINED WATER COOLERS AND FILTERS.

Specification forming part of Letters Patent No. 142,620, dated September 9, 1873; application filed August 16, 1873.

*To all whom it may concern:*

Be it known that I, WM. J. ENGLISH, of Providence, in the county of Providence and State of Rhode Island, have invented a new and Improved Filter, of which the following is a specification:

My invention consists of a double-cased filter with a dead-air space between, the outer case being constructed of *papier-maché*, or other equivalent non-conducting substance. My invention also consists of a partition in the inner case, dividing it into two compartments—one for the ice and the water to be filtered, and the other for the filtered water, with a filter in the bottom of the former compartment, arranged in three divisions, through which the water passes successively, the first and last containing gravel, and the middle one charcoal; and said filter is also arranged with a sloping top, against which the filtering substances pack by granulation, so that the water must pass through them, whereas, if the top were flat, a little space would be formed between the said material and the top by the settling of the former, along which the water might pass to the exit-passages at one side without passing through the said material.

Figure 1:
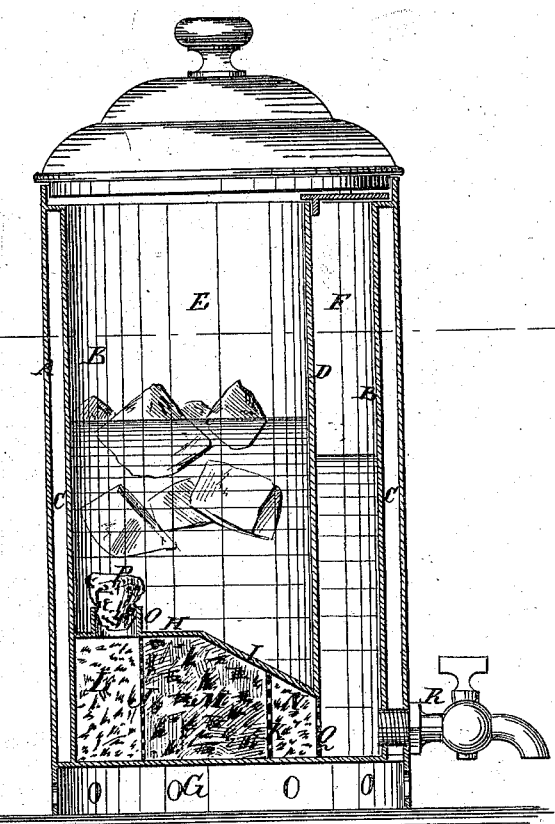
Figure 2:
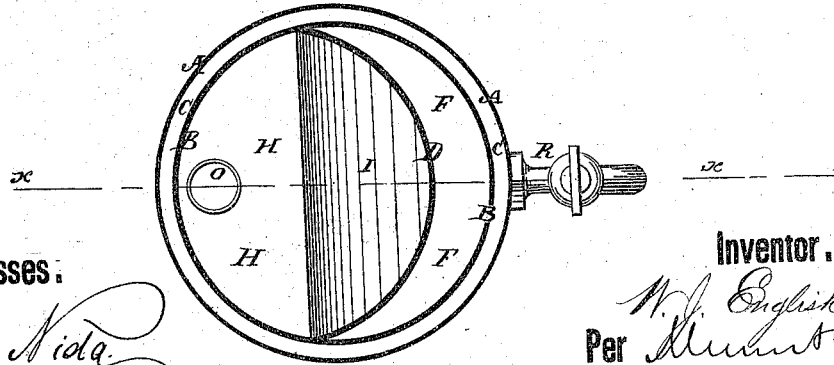

Figure 1 is a sectional elevation of my improved filter taken on the line $x\ x$ of Fig. 2, and Fig. 2 is a horizontal section taken on the line $y\ y$ of Fig. 1.

Similar letters of reference indicate corresponding parts.

A is the outer case, which, in practice, I propose to make of *papier-maché*, or other equivalent non-conducting material. B is the inner case, which may be made of thin sheet metal or earthenware. C is the dead-air space between the two cases. D is the partition dividing the interior case vertically into two compartments, E and F. G is the filter in the bottom of compartment E, in which the water and ice are placed together. It is separated from the water-compartment by the horizontal partition H and the sloping one I, and is divided vertically, by the perforated partitions J and K, into three comparments, L M N, of which the middle one is filled with charcoal, and the other two with gravel. The water enters the filter at the highest part through the passage O, in which a sponge, P, is packed, to separate the coarse matter from the water before entering the filter, and where they can be readily reached for removal. The filtering material in the compartments M and N settles or packs close against the inclined top I, so that the water cannot arrive at the exit-passages Q, except it pass through the mass, as it could if the partition was level, so that the material would settle away from it.

This is a matter of considerable importance in connection with filters in which it is necessary that the water pass through the filtering material laterally, as in this case, for otherwise it could pass through without being properly filtered.

The filtered water rises in the compartment F as high as the unfiltered water in compartment E, and is retained in it, subject to the influence of the ice in the other compartment, till wanted for use, when it is drawn out through the faucet R.

Having thus described my invention, I claim as new and desire to secure by Letters Patent—

1. A filter comprising an outer case of *papier-maché*, or other non-conducting material, A, an inner case of sheet metal, B, a partition, D, and a filter, G, all arranged and combined substantially as specified.

2. The filter having a descending top wall, I, between the inlet-passage O and the exit-passage Q, the latter being at one side of the filter, substantially as specified.

WILLIAM JOSEPH ENGLISH.

Witnesses:
EDWARD A. TURNER,
SAMUEL HEALY.